US012090773B2

(12) United States Patent
Dewig et al.

(10) Patent No.: US 12,090,773 B2
(45) Date of Patent: Sep. 17, 2024

(54) PRINTING PROCESS

(71) Applicant: BERRY GLOBAL, INC., Evansville, IN (US)

(72) Inventors: Joseph M. Dewig, Mount Vernon, IN (US); Shawn A. Hyneman, Evansville, IN (US); Russell Schwartz, Parsippany, NJ (US); Nigel Caiger, Bath (GB); Damian Ward, Bath (GB); Richard Baker, West Lebanon, NH (US)

(73) Assignee: BERRY GLOBAL, INC., Evansville, IN (US)

(*) Notice: Subject to any disclaimer, the term of this patent is extended or adjusted under 35 U.S.C. 154(b) by 39 days.

(21) Appl. No.: 17/710,018

(22) Filed: Mar. 31, 2022

(65) Prior Publication Data

US 2022/0314677 A1 Oct. 6, 2022

Related U.S. Application Data

(60) Provisional application No. 63/168,471, filed on Mar. 31, 2021.

(51) Int. Cl.
*B41M 5/00* (2006.01)
*B41M 7/00* (2006.01)

(52) U.S. Cl.
CPC ........ *B41M 5/0064* (2013.01); *B41M 5/0047* (2013.01); *B41M 7/0045* (2013.01); *B41M 7/0081* (2013.01)

(58) Field of Classification Search
CPC .............. B41M 5/0064; B41M 5/0047; B41M 7/0045; B41M 7/0081; B41M 5/03; B41M 5/0256
USPC ........................................................ 347/230
See application file for complete search history.

(56) References Cited

U.S. PATENT DOCUMENTS

| | | | | | |
|---|---|---|---|---|---|
| 6,354,700 | B1 | 3/2002 | Roth | | |
| 9,770,922 | B2 | 9/2017 | Cofler | | |
| 10,085,499 | B2 | 10/2018 | Hao | | |
| 2002/0086914 | A1 | 7/2002 | Lee | | |
| 2003/0165630 | A1 | 9/2003 | Baker | | |
| 2004/0231028 | A1 | 11/2004 | Triebes | | |
| 2006/0250427 | A1* | 11/2006 | Kroon | H04N 1/54 | 347/9 |
| 2007/0014955 | A1* | 1/2007 | Tanley | B31D 1/027 | 428/40.1 |
| 2007/0277690 | A1* | 12/2007 | Gervasi | B41N 10/04 | 101/368 |
| 2010/0079533 | A1 | 4/2010 | Gulvin | | |
| 2012/0314011 | A1 | 12/2012 | Wetjens | | |

(Continued)

FOREIGN PATENT DOCUMENTS

WO 2015097614 A1 7/2015

OTHER PUBLICATIONS

Polytek_SDS_Petroleum-Jelly Apr. 9, 2014 (Year: 2014).*

(Continued)

*Primary Examiner* — Jason S Uhlenhake
*Assistant Examiner* — Alexander D Shenderov
(74) *Attorney, Agent, or Firm* — Barnes & Thornburg LLP

(57) ABSTRACT

A method of printing on a polymeric article includes applying a decoration-forming deposit on a transfer blanket. The method further includes transferring the decoration-forming deposit from the transfer unit to the polymeric article to provide a decoration on the polymeric article.

18 Claims, 4 Drawing Sheets

(56) References Cited

U.S. PATENT DOCUMENTS

Figure 1:
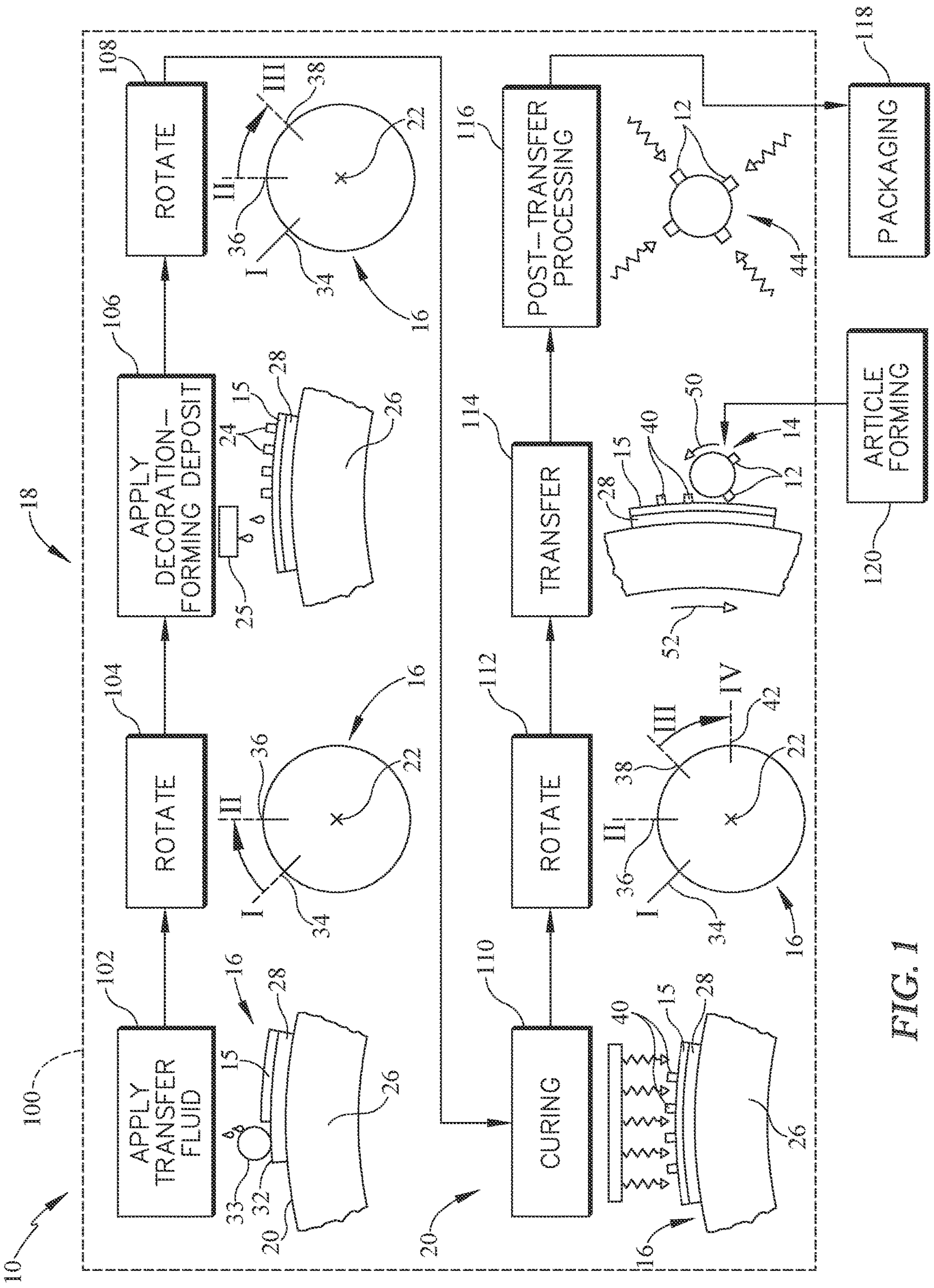

| | | | | |
|---|---|---|---|---|
| 2013/0145944 | A1 | 6/2013 | Platt | |
| 2014/0356538 | A1 | 12/2014 | Schmitt | |
| 2018/0250930 | A1 | 9/2018 | Sato | |
| 2018/0264163 | A1 | 9/2018 | Muslet | |
| 2018/0354253 | A1* | 12/2018 | Sawin | B41M 5/03 |
| 2020/0147944 | A1 | 5/2020 | Muslet | |

OTHER PUBLICATIONS

International (PCT) Search Report and Written Opinion for PCT/US22/22783 dated Jun. 13, 2022, BP-566 PCT ||, 11 pages.
Abbot. "Printing Science: Principles and Practice" p. 9 and 19-26 May 2018; Entire Document, 8 pages.
Kretzschmar. "Mechanical Properties of Ultraviolet-Assisted Paste Extrusion and 18 Postextrusion Ultraviolet-Curing of Three-Dimensional Printed Biocomposites" 127-137. 3D Printing and Additive Manufacturing. Web. 2019; p. 130, col. 2, para 2-3; DOI: 10.1089/3dp.2018.0148, 4 pages.
International (PCT) Search Report and Written Opinion for PCT/US24/0729 dated Jun. 26, 2024, 12 pages.

* cited by examiner

PRINTING PROCESS

PRIORITY CLAIM

This application claims priority under 35 U.S.C. § 119(e) to U.S. Provisional Application Ser. No. 63/168,471, filed Mar. 31, 2021, which is expressly incorporated by reference herein.

BACKGROUND

The present disclosure relates to printing, and particularly to printing on plastic materials. More particularly, the present disclosure relates to ink jet printing on plastic materials.

SUMMARY

According to the present disclosure, a digital print system is configured to provide decorations on polymeric articles through a digital printing process. The digital print system includes a rotary carrier, a printing unit, and a curing unit. The printing unit includes a support wheel and a plurality of transfer units coupled to the support wheel for rotation about an axis with the support wheel. The rotary carrier continuously rotates about the axis to move each transfer unit past the printing unit and the curing unit during the digital printing process.

In illustrative embodiments, the digital printing process includes applying a layer of transfer fluid on an outer surface of each transfer unit prior and then applying a decoration-forming deposit on an outer surface of the layer of transfer fluid. The digital printing process may further include curing, at least partially, the decoration-forming deposit after the step of applying the decoration-forming deposit on the layer of transfer fluid. The decoration-forming deposit may then be transferred from each transfer unit to a polymeric article to decorate the polymeric article.

In illustrative embodiments, the decoration-forming deposit has a first surface tension and a first viscosity and the layer of transfer fluid has a second surface tension and a second viscosity. The first surface tension may be about equal to or slightly less than the second surface tension and the first viscosity may be less than the second viscosity. In some embodiments, the decoration-forming deposit includes an ink and the layer of transfer fluid comprises a hydrocarbon such as petroleum jelly or mineral oil, for example.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
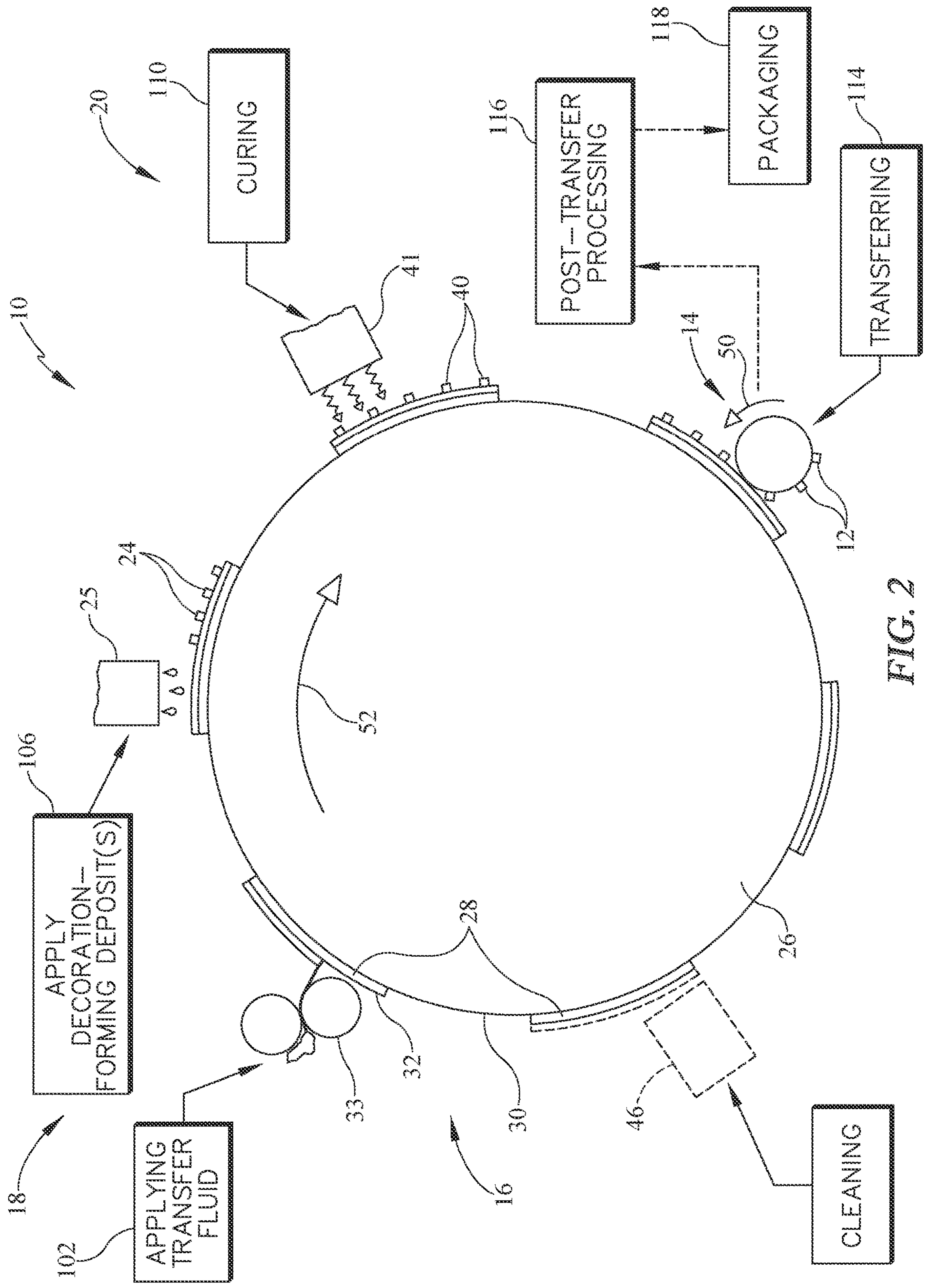
Figure 3:
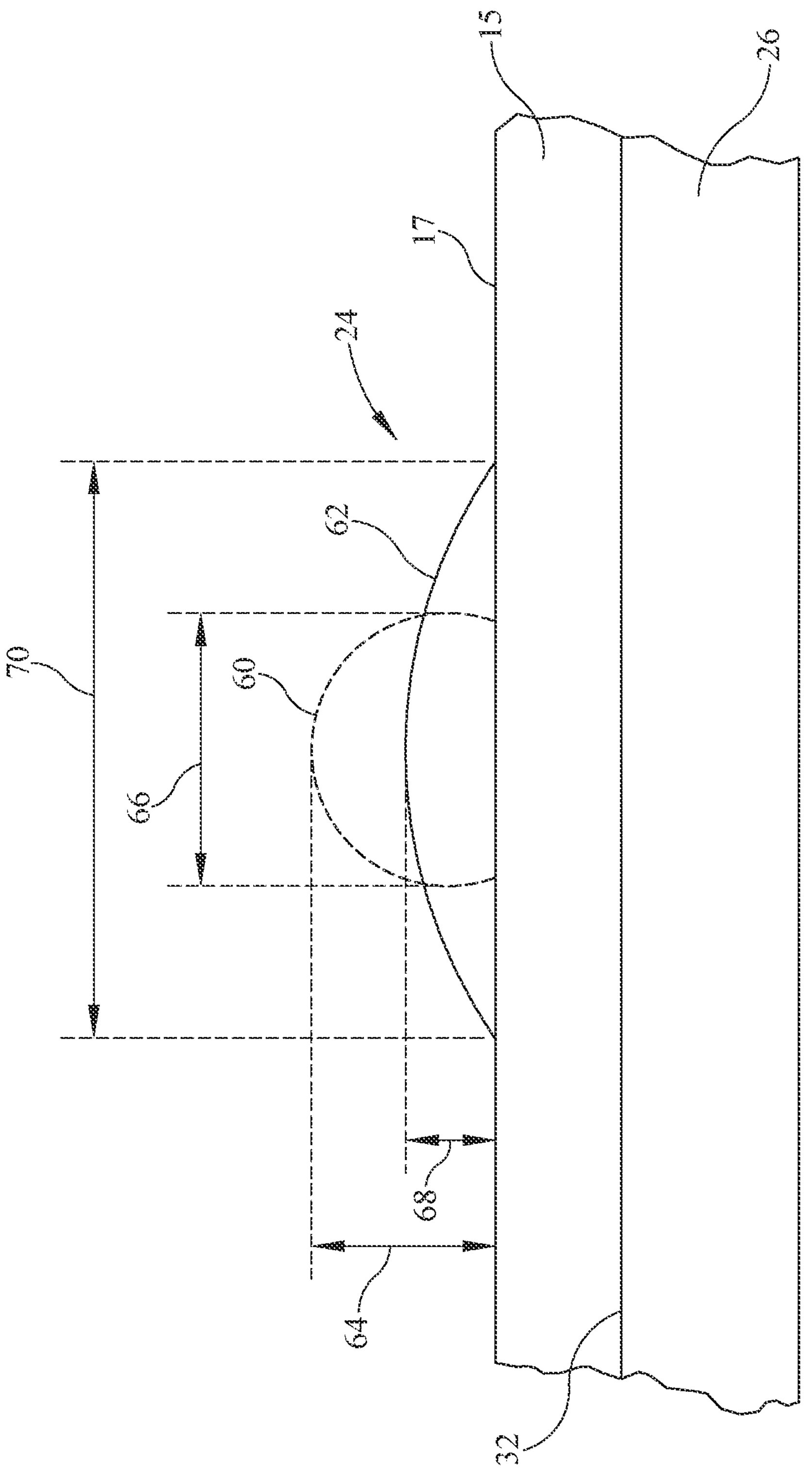
Figure 4:
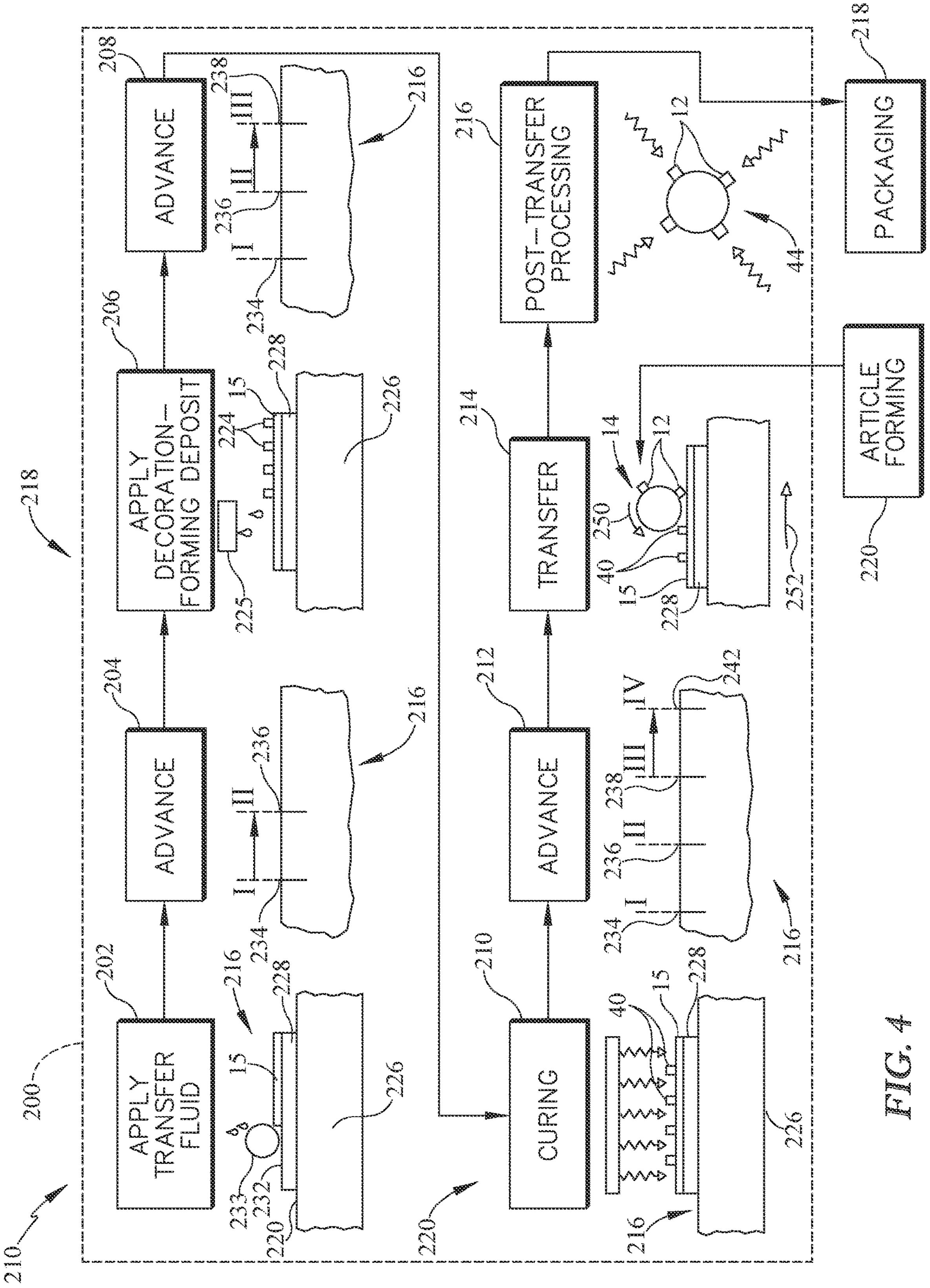

The detailed description particularly refers to the accompanying figures in which:

FIG. 1 is a flowchart of a process for digital printing on a polymeric article, in accordance with the present disclosure, showing that the process includes the steps applying a transfer fluid to a transfer unit, applying a decoration-forming deposit on the transfer fluid, curing the decoration-forming deposit, and transferring the cured decoration-forming deposit from the transfer unit to the polymeric article to produce a decorated article that may be packaged and transported;

FIG. 2 is a diagrammatic view of a digital print system configured to produce the decorated article from FIG. 1 by digital printing on a polymeric article;

FIG. 3 is an enlarged side view of a portion of a transfer unit with a layer of transfer fluid and a decoration-forming deposit applied thereon prior to transfer to the polymeric article showing that the transfer fluid and the decoration forming deposit include viscosity and surface tension properties that cause the decoration forming deposit to spread and sit on top of the transfer fluid in a way that the decoration-forming deposit may be transferred to the polymeric article with an acceptable resolution; and FIG. 4 is a flowchart of another process for digital printing on a polymeric article in accordance with the present disclosure.

DETAILED DESCRIPTION

A print system 10 in accordance with the present disclosure is configured to form a decoration 12 on a polymeric article 14 through a digital printing process 100 as shown in FIG. 1. The print system 10 includes a rotary carrier 16, a printing unit 18, and a curing unit 20 as shown in FIGS. 1 and 2. The rotary carrier 16 is configured to rotate about an axis 22 relative to both the printing unit 18 and the curing unit 20. The printing unit 18 is configured to apply a decoration-forming deposit 24 on the rotary carrier 16 for transfer to the polymeric article 14 later in process 100. The curing unit 20 is configured to at least partially cure the decoration-forming deposit 24. Once cured, the decoration-forming deposit 24 is transferred to the polymeric article 14 to form the decoration 12 on the polymeric article 14.

In illustrative embodiments, the digital printing process 100 includes applying a transfer fluid 15 to the rotary carrier 16 prior to applying the decoration-forming deposit 24 on the rotary carrier 16 as shown in FIG. 1. The printing unit 18 is a digital print unit that applies the decoration-forming deposit 24 on the transfer fluid 15 by ink jet printing, for example. In this way, the print system 10 provides non-blurry or high resolution decorations 12 on a plurality of polymeric articles 14 at a higher output rate than other digital printing systems and with shorter set-up, tear-down, and conversion times compared to other printing systems, such as dry offset printers or offset lithographic printers, for example. The transfer fluid 15 and the decoration-forming deposit 24 are selected based on their fluid properties relative to one another before and after interacting with rotary carrier 16, printing unit 18, and curing unit 20.

The rotary carrier 16 includes a support wheel 26 and a plurality of transfer units 28 (also called transfer blankets) coupled to a radially outer surface 30 of the support wheel 26 relative to the axis 22 as shown in FIG. 2. The support wheel 26 is a cylindrical roller that is configured to carry each of the transfer units 28 continuously through 360 degrees of rotation about axis 22. Each transfer unit 28 of the plurality of transfer units 28 may be made from polyvinyl chloride (PVC), urethane, or another type of polymeric material. Each transfer unit 28 is illustratively formed in the shape of an arcuate plate to conform to the outer surface 30 of the support wheel 26, and each transfer unit 28 is spaced apart circumferentially from each neighboring transfer unit 28 relative to axis 22. Individual applications of transfer fluid 15 and decoration-forming deposits 24 are applied on each transfer unit 28 such that each transfer unit 28 is configured to provide decoration 12 on a corresponding polymeric article for each rotation of the rotary carrier 16. In some embodiments, the radially outer surface 30 of the support wheel 26 may be used as a single transfer unit 28 on which transfer fluid 15 and a plurality of decoration-forming deposits 24 are applied to provide decoration 12 on a plurality of polymeric articles 14.

The digital printing process 100 completes several steps at various angular positions relative to axis 22 as the support wheel 26 rotates about axis 22. The digital printing process 100 includes a step 102 of applying the transfer fluid 15 to an outer surface 32 of a transfer unit 28 to form a layer of the transfer fluid 15 along the outer surface 32. Step 102 occurs at a first angular position 34 about axis 22 (or between first angular position 34 and second angular position 36). The layer of transfer fluid 15 may be applied along an entire surface area of the outer surface 32 or only a portion thereof. The step 102 of applying the transfer fluid 15 may include rolling the transfer fluid 15 onto the outer surface 32 of the transfer unit 28 with one or more transfer rollers 33. The step 102 of applying the transfer fluid 15 may include applying a continuous and/or constant layer of transfer fluid 15 on the outer surface 32. The layer of transfer fluid 15 may have a radial thickness within a range of about 1 micrometer to about 2 micrometers. In some embodiments, the thickness is within a range of about 0.01 micrometers to about 0.1 micrometers. In some embodiments, the thickness is within a range of about 0.5 micrometers to about 2.5 micrometers. In some embodiments, the thickness is greater than about 1 micrometer.

The digital printing process 100 includes a step 104 of rotating the rotary carrier 16 including the transfer unit 28 with the layer of transfer fluid 15 to a second angular position 36 as shown in FIG. 1. At the second angular position, the digital printing process 100 includes a step 106 of applying the decoration-forming deposit 24 on the transfer fluid 15. The step 106 of applying the decoration-forming deposit 24 may include applying the decoration-forming deposit 24 with an ink-jet printer 25 or by ink-jet printing the decoration-forming deposit 24 onto the transfer fluid 15. The decoration-forming deposit 24 is a mirror image of the decoration 12 that is transferred to the polymeric article 14 in one or more later steps and may include any arrangement or pattern of inks that form the decoration 12. The digital printing process 100 may include a plurality of sub-steps of applying the decoration-forming deposit 24, for example, if different inks are applied to the transfer fluid 15 at different angular positions relative to axis 22.

The digital printing process 100 includes a step 108 of rotating the rotary carrier 16 including the transfer unit 28 with the layer of transfer fluid 15 and the decoration-forming deposit 24 to a third angular position 38 as shown in FIG. 1. At the third angular position 28, the digital printing process 100 includes a step 110 of curing the decoration-forming deposit 24 to provide a cured decoration-forming deposit 40. The step 110 of curing may include only partially curing the decoration-forming deposit 24. The decoration-forming deposit 24 is only partially cured at step 110, in the illustrative embodiment, to increase a tackiness and/or viscosity of the decoration-forming deposit 24 to block wetting, setting, and/or mixing of the decoration-forming deposit 24 with the transfer fluid 15 and to block overspreading of the decoration-forming deposit 24 across the transfer fluid 15. In some embodiments, the decoration-forming deposit 24 includes a viscosity and/or a surface tension that does not require the step 110 of curing. The transfer fluid 15 includes a material that does not cure during the step 110 of curing.

During the step 108 of curing, the decoration-forming deposit 24 is brought under or near light source 41 as shown in FIGS. 1 and 2. The light source 41 in the illustrative embodiment is an ultraviolet (UV) light source. The decoration-forming deposit 24 may be exposed to a 395 nm light from the UV light source 41 at a power level within a range of about 24 milliJoules to about 95 milliJoules, for example. In some embodiments, the light source 41 includes an iron doped mercury vapor light source 41 or a light emitting diode (LED) light source. In one example, the LED light source 41 is configured to emit a 280 nm light. In other embodiments, another wavelength, light, and/or a different power level may be used.

The digital printing process 100 includes a step 112 of rotating the rotary carrier 16 including the transfer unit 28 with the layer of transfer fluid 15 and the cured decoration-forming deposit 40 to a fourth angular position 42 as shown in FIG. 1. At the fourth angular position 42, the digital printing process 100 includes a step 114 of transferring the cured decoration-forming deposit 40 to a polymeric article 14. At step 114, the polymeric article 14 is brought into contact with the cured decoration-forming deposit 40 so that the cured decoration-forming deposit 40 transfers to the polymeric article 14. Only the decoration-forming deposit 40 is transferred to the polymeric article 14 and the transfer fluid 15 remains on the transfer unit 28 for reuse in receiving additional decoration-forming deposits 24 and transferring those decoration-forming deposits 24 to other polymeric articles 14.

Illustratively, the polymeric article 14 is a container having a cylindrical or a tapered side wall (i.e. a side wall with a varying diameter from a top end to a bottom end of the article 14) as shown in FIG. 1. Digital printing to an article 14 with a tapered side wall may cause residual decoration-forming deposits 24 to smear or slur, thereby resulting in a blurry decoration 12 formed on the article 14. The digital printing process provided by the digital print system 10 reduces or eliminates smearing or slurring of the decoration forming deposit 24 when printing to articles 14 having a tapered side wall. In some embodiments, digital printing process 100 results in all of the decoration-forming deposits 24 being transferred to the article 14 from the transfer unit 28 at step 114 so that smearing and/or slurring does not occur.

The container rotates in a direction 50 opposite to a direction 52 of rotation of the rotary carrier 16 so that the decoration 12 is provided around a circumference of the side wall of the container or partway around the circumference of the side wall. In some embodiments, the polymeric article may include a sheet or another polymeric article having a planar surface, such as a closure, lid, or cap, on which the decoration 12 is provided.

The digital printing process 100 may include a step 116 of post-transfer processing of the polymeric article 14 with the cured decoration-forming deposit 40 applied thereon as shown in FIG. 1. The step 116 of post-transfer processing may include a step of fully-curing cured the decoration-forming deposit 40 to provide the decoration 12 on the polymeric article 14. If the decoration-forming deposit 24 was not previously cured prior to the step 114 of transferring, the decoration-forming deposit 24 may be cured in the step 116 of post-transfer processing. In some embodiments, the polymeric article 14 having the decoration 12 formed thereon may be laminated, rolled, formed, or otherwise converted during the step 116 of post-transfer processing to provide a finished article 44 that is ready for use. Following the step 116 of post-transfer processing, the finished article 44 may be packaged 118 for storage or transportation.

Prior to being coated or decorated with the decoration forming deposit 24, 40, the polymeric articles 14 are formed in a step 120. Step 120 may be included in the digital printing process or may be separate from the digital printing process 100. The polymeric article 14 may be formed using any suitable forming method, such as, for example, rotary thermoforming, deep draw thermoforming, blow molding, injection molding, casting, molding on a tread of molds, flatbed thermoforming, etc. Once formed, the polymeric article 14 may be pretreated prior to receiving the decoration-forming deposit 24, 40 at step 114. Pre-treating the polymeric article 14 may include increasing a surface tension of at least the portion(s) of the polymeric article 14 that receives the decoration forming deposit 24, 40 at step 114. In one example, the surface tension of the polymeric article 14 is increased from less than 40 dyne/cm to greater than 40 dyne/cm. In some embodiments, the surface tension of the polymeric article 14 is increased from about 20 dyne/cm to greater than or equal to 40 dyne/cm. In some embodiments, a varnish is applied on the polymeric article 14 prior to step 114.

In some embodiments, the transfer fluid 15 and any decoration forming deposit 24, 40 remaining on the transfer fluid 15 after the step 114 of transferring may be cleaned from the transfer unit 28 as shown in FIG. 2. In such an embodiment, a cleaning system 46, such as a squeegee, scraper, or fluid-jet, for example, is included in the digital printing unit 10 to clear each transfer unit 28 of the transfer fluid 15 and any decoration forming deposit 24, 40 remaining on the transfer fluid 15 after the step 114 of transferring. However, the cleaning system 46 may not be needed with the digital printing unit 10 because the transfer fluid 15 and the decoration-forming deposit 24 are selected based on their fluid properties relative to one another such that transfer and formation of the decoration 12 on the polymeric article 14 is accomplished through digital printing process 100. In this way, the polymeric articles 14 are decorated through digital printing means which provides a higher output rate than other digital printing processes. In the illustrative embodiment, the print system 10 provides decoration 12 on polymeric articles 14 at a rate of about 500 parts per minute using digital printing process 100.

In one non-limiting example, the decoration-forming deposit 24 has a first surface tension and a first viscosity, and the transfer fluid 15 has a second surface tension and a second viscosity. The first surface tension is about equal to or slightly less than the second surface tension, and the first viscosity is less than the second viscosity. In some embodiments, the transfer fluid 15 includes a UV curable varnish. In some embodiments, the transfer fluid 15 is omitted and each transfer unit 28 has the same or similar characteristics (i.e. viscosity and surface tension) to the transfer fluid 15.

In some embodiments, the first viscosity is within a range of about 5 centipoise (cP) to about 150 cP. In some embodiments, the first viscosity is within a range of about 5 centipoise (cP) to about 100 cP. In some embodiments, the first viscosity is within a range of about 10 centipoise (cP) to about 100 cP. In some embodiments, the first viscosity is within a range of about 20 centipoise (cP) to about 100 cP. In some embodiments, the first viscosity is within a range of about 30 centipoise (cP) to about 100 cP. In some embodiments, the first viscosity is within a range of about 40 centipoise (cP) to about 100 cP. In some embodiments, the first viscosity is within a range of about 50 centipoise (cP) to about 100 cP. In some embodiments, the first viscosity is within a range of about 60 centipoise (cP) to about 100 cP. In some embodiments, the first viscosity is within a range of about 70 centipoise (cP) to about 100 cP. In some embodiments, the first viscosity is within a range of about 80 centipoise (cP) to about 100 cP. In some embodiments, the first viscosity is within a range of about 90 centipoise (cP) to about 100 cP. In some embodiments, the first viscosity is within a range of about 5 centipoise (cP) to about 90 cP. In some embodiments, the first viscosity is within a range of about 5 centipoise (cP) to about 80 cP. In some embodiments, the first viscosity is within a range of about 5 centipoise (cP) to about 70 cP. In some embodiments, the first viscosity is within a range of about 5 centipoise (cP) to about 60 cP. In some embodiments, the first viscosity is within a range of about 5 centipoise (cP) to about 50 cP. In some embodiments, the first viscosity is within a range of about 5 centipoise (cP) to about 40 cP. In some embodiments, the first viscosity is within a range of about 5 centipoise (cP) to about 30 cP. In some embodiments, the first viscosity is within a range of about 5 centipoise (cP) to about 20 cP. In some embodiments, the first viscosity is within a range of about 5 centipoise (cP) to about 10 cP.

In some embodiments, the second viscosity is within a range of about 200 centipoise (cP) to about 65,000 cP. In some embodiments, the second viscosity is within a range of about 200 centipoise (cP) to about 64,000 cP. In some embodiments, the second viscosity is within a range of about 200 centipoise (cP) to about 65,000 cP. In some embodiments, the second viscosity is within a range of about 900 cP to about 65,000 cP. In some embodiments, the second viscosity is within a range of about 1,000 cP to about 64,000 cP. In some embodiments, the second viscosity is within a range of about 2,000 cP to about 64,000 cP. In some embodiments, the second viscosity is within a range of about 3,000 cP to about 64,000 cP. In some embodiments, the second viscosity is within a range of about 4,000 cP to about 64,000 cP. In some embodiments, the second viscosity is within a range of about 5,000 cP to about 64,000 cP. In some embodiments, the second viscosity is within a range of about 6,000 cP to about 64,000 cP. In some embodiments, the second viscosity is within a range of about 7,000 cP to about 64,000 cP. In some embodiments, the second viscosity is within a range of about 8,000 cP to about 64,000 cP. In some embodiments, the second viscosity is within a range of about 9,000 cP to about 64,000 cP. In some embodiments, the second viscosity is within a range of about 10,000 cP to about 64,000 cP. In some embodiments, the second viscosity is within a range of about 300 centipoise (cP) to about 65,000 cP. In some embodiments, the second viscosity is within a range of about 400 centipoise (cP) to about 65,000 cP. In some embodiments, the second viscosity is within a range of about 500 centipoise (cP) to about 65,000 cP. In some embodiments, the second viscosity is within a range of about 600 centipoise (cP) to about 65,000 cP. In some embodiments, the second viscosity is within a range of about 700 centipoise (cP) to about 65,000 cP. In some embodiments, the second viscosity is within a range of about 800 centipoise (cP) to about 65,000 cP. In some embodiments, the second viscosity is within a range of about 900 centipoise (cP) to about 65,000 cP. In some embodiments, the first viscosity is less than 1,000 cP and the second viscosity is greater than 1,000 cP.

In some embodiments, the second surface tension is within a range of about 30 dyne/cm to about 38 dyne/cm and the first surface tension is within a range of about 25 dyne/cm to about 29 dyne/cm. In some embodiments, the second surface tension is within a range of about 30 dyne/cm to about 35 dyne/cm and the first surface tension is within a range of about 26 dyne/cm to about 28 dyne/cm. In some embodiments, the first surface tension is within a range of about 5 dyne/cm to about 10 dyne/cm less than the second surface tension.

The transfer fluid 15 may include a hydrocarbon. In some embodiments, the transfer fluid 15 includes petroleum jelly such as VASELINE®, for example. In some embodiments, the transfer fluid 15 includes mineral oil. In some embodiments, the transfer fluid 15 includes a blend of mineral oil(s) and wax(es). In some embodiments, the transfer fluid 15 includes a low acrylic gellen gum (LAGG). In some embodiments, the transfer fluid 15 includes water. In some embodiments, the transfer fluid 15 includes mineral oil and oil thickener such as hydrogenated vegetable oil, for example. The blend may include between 75% and 95% mineral oil and between 5% and 25% oil thickener. In some embodiments, the transfer fluid 15 includes a blend of petroleum jelly and an oil such as vegetable oil, for example. The blend may include between 25% and 75% coconut oil in some embodiments. The decoration-forming deposit 24 includes an ink. Illustratively, the ink is a curable acrylate ink, by UV light, for example.

After the step 106 of applying the decoration forming deposit 24 on the transfer fluid 15, the decoration-forming deposit 24 may spread across the transfer fluid 15 from a bead-shaped arrangement 60 to a dome-shaped arrangement 62 as shown in FIG. 3. In the bead-shaped arrangement, the decoration-forming deposit 24 has a first height 64 and a first width 66. In the dome-shaped arrangement 62 the decoration-forming deposit 24 has a second height 68 less than the first height 64, and has a second width 70 greater than the first width 66. The decoration-forming deposit 24 may be retained in the dome-shaped arrangement 62 as a result of step 110 of curing the decoration-forming deposit 24 to increase its tackiness or viscosity so that the decoration-forming deposit 24 may be transferred to the polymeric article without overspreading and forming a blurry decoration 12.

The decoration-forming deposit 24 may change from the bead-shaped arrangement 60 to the dome-shaped arrangement 62 after being in contact with the transfer fluid 15 for a period of time (i.e. a degree of wetting and/or contact angle of the decoration-forming deposit 24). As previously described, the transfer fluid 15 and the decoration-forming deposit 24 are selected based on their viscosity and surface tension relative to one another. This relationship results in the decoration-forming deposit 24 having a degree of wetting that provides the dome-shaped arrangement 62 and thereby provides a non-blurry decoration 12 on polymeric article 14 at step 114 while the polymeric articles 14 are decorated through digital printing process 100 with a high output rate. In the dome-shaped arrangement 62, all of the decoration-forming deposit 24 is arranged above an upper surface 17 of the transfer fluid 15 and does not under-spread across upper surface 17, over-spread across the upper surface 17, or mix with the transfer fluid 15. Under-spreading across the upper surface 17, overspreading across the upper surface 17, or mixing with the transfer fluid 15 may result in a blurry decoration 12 on the polymeric article 14.

Another digital printing process 200 is shown in FIG. 4. Digital printing process 200 is similar to digital printing process 100. Accordingly, similar reference numbers in the 200 series are used to indicate similar features between digital printing process 200 and digital printing process 100. The disclosure of digital printing process 100 is hereby incorporated by reference herein for digital printing process 200 except for differences described below.

A digital print unit 210 is configured to form decoration 212 on a polymeric article 214 through the digital printing process 200 as shown in FIG. 4. Digital print unit 210 does not include a rotary carrier, and instead includes a carrier 16 that advances a plurality of transfer units 228 in a linear manner between steps, for example. The digital printing process 200 completes several steps at various positions relative to a carrier 216 including a support 226 and a transfer unit 228 coupled to an upper surface 230 of the support 226. The digital printing process 200 includes a step 202 of applying transfer fluid 15 to an upper surface 232 of a transfer unit 228 to form a layer of the transfer fluid 15 along the upper surface 232. The first step 202 occurs at a first position 234 of the digital printing unit 210 (or between first position 234 and second position 236).

The digital printing process 200 further includes a step 204 of advancing the carrier 216 including the transfer unit 228 with the layer of transfer fluid 15 to a second position 236 as shown in FIG. 4. At the second position 236, the digital printing process 200 includes a step 206 of applying decoration-forming deposit 24 on the transfer fluid 15.

The digital printing process 200 further includes a step 208 of advancing the carrier 216 including the transfer unit 228 with the layer of transfer fluid 15 and the decoration-forming deposit 24 to a third position 238 as shown in FIG. 4. At the third position 238, the digital printing process 200 includes a step 210 of curing the decoration-forming deposit 24 to provide cured decoration-forming deposit 40. The decoration-forming deposit 24 is only partially cured at step 210, in the illustrative embodiment, to increase a tackiness and/or viscosity of the decoration-forming deposit 24 to block wetting, setting, and/or mixing of the decoration-forming deposit 24 with the transfer fluid 15 and to block overspreading of the decoration-forming deposit 24 across the transfer fluid 15. The transfer fluid 15 includes a material that does not cure during the step 210 of curing. During the step 208 of curing, the decoration-forming deposit 24 is brought under or near to an ultra-violet (UV) light source 241 as shown in FIG. 4.

The digital printing process 200 includes a step 212 of advancing the carrier 216 including the transfer unit 228 with the layer of transfer fluid 15 and the cured decoration-forming deposit 40 to a fourth position 242 as shown in FIG. 4. At the fourth position 242, the digital printing process 200 includes a step 214 of transferring the cured decoration-forming deposit 40 to a polymeric article 14.

The digital printing process 200 may include a step 216 of post-transfer processing of the polymeric article 14 with the cured decoration-forming deposit 40 applied thereon as shown in FIG. 4. Following the step 216 of post-transfer processing, the finished article 44 may be packaged 218 for storage or transportation. Prior to being coated or decorated with the decoration forming deposit 24, 40, the polymeric articles 14 are formed in a step 220.

The following numbered clauses describe embodiments that are contemplated and non-limiting:

Clause 1. A method of digital printing on a polymeric article includes providing a rotary carrier including a support wheel and a transfer unit coupled to the support wheel for rotation about an axis with the support wheel.

Clause 2. The method of clause 1, any other clause, or any combination of clauses, including rotating the rotary carrier and the transfer unit about the axis from a first angular position to a second angular position.

Clause 3. The method of clause 2, any other clause, or any combination of clauses, including applying a layer of transfer fluid on an outer surface of the transfer unit when the transfer unit is at the first angular position or between the first angular position and the second angular position.

Clause 4. The method of clause 3, any other clause, or any combination of clauses, including applying a decoration-forming deposit on the layer of transfer fluid.

Clause 5. The method of clause 4, any other clause, or any combination of clauses, including curing, at least partially, the decoration-forming deposit after the step of applying the decoration-forming deposit on the layer of transfer fluid.

Clause 6. The method of clause 5, any other clause, or any combination of clauses, including transferring the decoration-forming deposit from the transfer unit to the polymeric article when the transfer unit is at the second angular position.

Clause 7. The method of clause 1, any other clause, or any combination of clauses, wherein the decoration-forming deposit has a first surface tension and a first viscosity and wherein the layer of transfer fluid has a second surface tension and a second viscosity, the first surface tension being about equal to or less than the second surface tension and the first viscosity being less than the second viscosity.

Clause 8. The method of clause 7, any other clause, or any combination of clauses, wherein the decoration-forming deposit includes an ink.

Clause 9. The method of clause 7, any other clause, or any combination of clauses, wherein the layer of transfer fluid comprises a hydrocarbon.

Clause 10. The method of clause 9, any other clause, or any combination of clauses, wherein the layer of transfer fluid comprises petroleum jelly.

Clause 11. The method of clause 9, any other clause, or any combination of clauses, wherein the layer of transfer fluid comprises mineral oil.

Clause 12. The method of clause 7, any other clause, or any combination of clauses, wherein the first viscosity is within a range of about 5 cP to about 150 cP and the second viscosity is within a range of about 900 cP to about 65,000 cP.

Clause 13. The method of clause 12, any other clause, or any combination of clauses, wherein the first viscosity is within a range of about 5 cP to about 100 cP and the second viscosity are each within a range of about 1,000 cP to about 64,000 cP.

Clause 14. The method of clause 7, any other clause, or any combination of clauses, wherein the first surface tension is about 5 dyne/cm to about 10 dyne/cm less than the second surface tension.

Clause 15. The method of clause 7, any other clause, or any combination of clauses, wherein the first surface tension is within a range of about 25 dyne/cm to about 29 dyne/cm and the second surface tension is within a range of about 30 dyne/cm to about 38 dyne/cm.

Clause 16. The method of clause 15, any other clause, or any combination of clauses, wherein the first surface tension is within a range of about 26 dyne/cm to about 28 dyne/cm and the second surface tension is within a range of about 30 dyne/cm to about 35 dyne/cm.

Clause 17. The method of clause 7, any other clause, or any combination of clauses, wherein the transfer unit comprises urethane.

Clause 18. The method of clause 6, any other clause, or any combination of clauses, wherein the step of applying a layer of transfer fluid includes rolling the transfer fluid onto the transfer unit.

Clause 19. The method of clause 18, any other clause, or any combination of clauses, wherein the step of rolling the transfer fluid onto the transfer unit includes providing a continuous layer of the transfer fluid having a thickness within a range of about 0.01 micrometers to about 0.1 micrometers.

Clause 20. The method of clause 6, any other clause, or any combination of clauses, wherein the layer of transfer fluid does not cure during the step of curing.

Clause 21. The method of clause 6, any other clause, or any combination of clauses, further including a step of applying a varnish on the polymeric article.

Clause 22. The method of clause 6, any other clause, or any combination of clauses, further including pretreating the polymeric article so that the polymeric article has a surface tension greater than about 40 dyne/cm.

Clause 23. The method clause 6, any other clause, or any combination of clauses, wherein the step of curing the decoration-forming deposit includes exposing the decoration-forming deposit to a 395 nm light within a range of about 24 milliJoules to about 95 milliJoules.

Clause 24. A method of printing on a polymeric article includes providing a carrier including a support foundation and a transfer unit coupled to the support foundation for movement with the support foundation.

Clause 25. The method of clause 24, any other clause, or any combination of clauses, including advancing the carrier and the transfer unit from a first position to a second position.

Clause 26. The method of clause 25, any other clause, or any combination of clauses, including applying a layer of transfer fluid on an outer surface of the transfer unit when the transfer unit is between the first position and the second position.

Clause 27. The method of clause 26, any other clause, or any combination of clauses, including applying a decoration-forming deposit on the layer of transfer fluid.

Clause 28. The method of clause 27, any other clause, or any combination of clauses, including transferring the decoration-forming deposit from the transfer unit to the polymeric article when the transfer unit is at the second position.

Clause 29. The method of clause 28, any other clause, or any combination of clauses, further including a step of curing the decoration-forming deposit after applying the decoration-forming deposit to the layer of transfer fluid between the first position and the second position.

Clause 30. The method of clause 29, any other clause, or any combination of clauses, wherein the decoration-forming deposit includes an ink having a first surface tension and a first viscosity and wherein the layer of transfer fluid includes a primer fluid having a second surface tension and a second viscosity, the first surface tension being about equal to or less than the second surface tension and the first viscosity being less than the second viscosity.

Clause 31. A method of printing on a polymeric article includes providing a rotary carrier including a support wheel and a transfer unit coupled to the support wheel for rotation about an axis with the support wheel.

Clause 32. The method of clause 31, any other clause, or any combination of clauses, including rotating the rotary carrier and the transfer unit about the axis from a first angular position to a second angular position.

Clause 33. The method of clause 32, any other clause, or any combination of clauses, including applying a layer of transfer fluid on an outer surface of the transfer unit when the transfer unit is between the first angular position and the second angular position.

Clause 34. The method of clause 33, any other clause, or any combination of clauses, including applying a decoration-forming deposit on the layer of transfer fluid.

Clause 35. The method of clause 34, any other clause, or any combination of clauses, including transferring the decoration-forming deposit from the transfer unit to the polymeric article when the transfer unit is at the second angular position.

Clause 36. The method of clause 35, any other clause, or any combination of clauses, further including a step of curing the decoration-forming deposit after applying the decoration-forming deposit to the layer of transfer fluid between the first angular position and the second angular position.

Clause 37. The method clause 36, any other clause, or any combination of clauses, wherein the step of curing the decoration-forming deposit includes exposing the decoration-forming deposit to a 395 nm light within a range of about 24 milliJoules to about 95 milliJoules.

Clause 38. The method of clause 37, any other clause, or any combination of clauses, wherein the layer of transfer fluid does not cure during the step of curing.

Clause 39. A method of printing on a polymeric article includes providing a rotary carrier including a support wheel and a transfer unit coupled to the support wheel for rotation about an axis with the support wheel.

Clause 40. The method of clause 39, any other clause, or any combination of clauses, including rotating the rotary carrier and the transfer unit about the axis from a first angular position to a second angular position.

Clause 41. The method of clause 40, any other clause, or any combination of clauses, including applying a layer of transfer fluid on an outer surface of the transfer unit when the transfer unit is between the first angular position and the second angular position.

Clause 42. The method of clause 41, any other clause, or any combination of clauses, including applying a decoration-forming deposit on the layer of transfer fluid.

Clause 43. The method of clause 42, any other clause, or any combination of clauses, including increasing a tack of the decoration-forming deposit.

Clause 44. The method of clause 43, any other clause, or any combination of clauses, including transferring the decoration-forming deposit from the transfer unit to the polymeric article when the transfer unit is at the second angular position.

Clause 45. A method of printing on a polymeric article includes providing a rotary carrier including a support wheel and a transfer unit coupled to the support wheel for rotation about an axis with the support wheel.

Clause 46. The method of clause 45, any other clause, or any combination of clauses, including rotating the rotary carrier and the transfer unit about the axis from a first angular position to a second angular position.

Clause 47. The method of clause 46, any other clause, or any combination of clauses, including applying a decoration-forming deposit on the transfer unit.

Clause 48. The method of clause 47, any other clause, or any combination of clauses, including increasing a tack of the decoration-forming deposit.

Clause 49. The method of clause 48, any other clause, or any combination of clauses, including transferring the decoration-forming deposit from the transfer unit to the polymeric article when the transfer unit is at the second angular position.

Clause 50. The method of clause 49, any other clause, or any combination of clauses, including wherein the decoration-forming deposit has a first surface tension and a first viscosity and wherein the transfer unit has a second surface tension and a second viscosity, the first surface tension being about equal to or less than the second surface tension and the first viscosity being less than the second viscosity.

The invention claimed is:

1. A method of digital printing on a polymeric article, the method comprising the steps of providing a rotary carrier including a support wheel and a transfer unit coupled to the support wheel for rotation about an axis with the support wheel, rotating the rotary carrier and the transfer unit about the axis from a first angular position to a second angular position, applying a layer of transfer fluid on an outer surface of the transfer unit when the transfer unit is at the first angular position or between the first angular position and the second angular position, applying a decoration-forming deposit on the layer of transfer fluid, wherein the decoration-forming deposit includes an ink and is applied directly on the layer of transfer fluid, curing, at least partially, the decoration-forming deposit after the step of applying the decoration-forming deposit on the layer of transfer fluid, and transferring the decoration-forming deposit from the transfer unit to the polymeric article when the transfer unit is at the second angular position, wherein the decoration-forming deposit has a first surface tension and a first viscosity and wherein the layer of transfer fluid has a second surface tension and a second viscosity, the first surface tension being equal to or less than the second surface tension and the first viscosity being less than the second viscosity.

2. The method of claim 1, wherein the layer of transfer fluid comprises a hydrocarbon.

3. The method of claim 1, wherein the layer of transfer fluid comprises petroleum jelly.

4. The method of claim 1, wherein the layer of transfer fluid comprises mineral oil.

5. The method of claim 1, wherein the first viscosity is within a range of 5 cP to 150 cP and the second viscosity is within a range of 900 cP to 65,000 cP.

6. The method of claim 5, wherein the first viscosity is within a range of 5 cP to 100 cP and the second viscosity are each within a range of 1,000 cP to 64,000 cP.

7. The method of claim 1, wherein the first surface tension is within a range of 5 dyne/cm to 10 dyne/cm less than the second surface tension.

8. The method of claim 1, wherein the first surface tension is within a range of 25 dyne/cm to 29 dyne/cm and the second surface tension is within a range of 30 dyne/cm to 38 dyne/cm.

9. The method of claim 8, wherein the first surface tension is within a range of 26 dyne/cm to 28 dyne/cm and the second surface tension is within a range of 30 dyne/cm to 35 dyne/cm.

10. The method of claim 1, wherein the transfer unit comprises urethane.

11. The method of claim 1, wherein the step of applying a layer of transfer fluid includes rolling the transfer fluid onto the transfer unit.

12. The method of claim 11, wherein the step of rolling the transfer fluid onto the transfer unit includes providing a continuous layer of the transfer fluid having a thickness within a range of 0.01 micrometers to 0.1 micrometers.

13. The method of claim 1, wherein the layer of transfer fluid does not cure during the step of curing.

14. The method of claim 1, further comprising a step of applying a varnish on the polymeric article.

15. The method of claim 1, further comprising pretreating the polymeric article so that the polymeric article has a surface tension greater than 40 dyne/cm.

16. The method claim 1, wherein the step of curing the decoration-forming deposit includes exposing the decoration-forming deposit to a 395 nm light within a range of 24 milliJoules to 95 milliJoules.

17. A method of printing on a polymeric article, the method comprising steps of providing a carrier including a support foundation and a transfer unit coupled to the support foundation for movement with the support foundation, advancing the carrier and the transfer unit from a first position to a second position, applying a layer of transfer fluid on an outer surface of the transfer unit when the transfer unit is at the first position or between the first position and the second position, applying a decoration-forming deposit on the layer of transfer fluid, and transferring the decoration-forming deposit from the transfer unit to the polymeric article when the transfer unit is at the second position, wherein the decoration-forming deposit includes an ink having a first surface tension and a first viscosity and wherein the layer of transfer fluid includes a primer fluid having a second surface tension and a second viscosity, the first surface tension being equal to or less than the second surface tension and the first viscosity being less than the second viscosity, and wherein the primer fluid includes petroleum jelly.

18. The method of claim 17, further comprising a step of curing the decoration-forming deposit after applying the decoration-forming deposit to the layer of transfer fluid.

* * * * *